(12) United States Patent
Yang et al.

(10) Patent No.: US 12,184,183 B2
(45) Date of Patent: Dec. 31, 2024

(54) FLYBACK POWER CONVERTER HAVING EMULATED DEMAGNETIZED SIGNAL AND SWITCHING CONTROL CIRCUIT AND CONTROL METHOD THEREOF

(71) Applicant: Richtek Technology Corporation, Zhubei (TW)

(72) Inventors: Ta-Yung Yang, Taoyuan (TW); Ying-Chieh Su, Taipei (TW); Yu-Chang Chen, Nantou (TW)

(73) Assignee: RICHTEK TECHNOLOGY CORPORATION, Hsinchu (TW)

( * ) Notice: Subject to any disclaimer, the term of this patent is extended or adjusted under 35 U.S.C. 154(b) by 403 days.

(21) Appl. No.: 17/673,158

(22) Filed: Feb. 16, 2022

(65) Prior Publication Data

US 2022/0271675 A1      Aug. 25, 2022

Related U.S. Application Data

(60) Provisional application No. 63/241,090, filed on Sep. 6, 2021, provisional application No. 63/231,806, filed on Aug. 11, 2021, provisional application No. 63/230,419, filed on Aug. 6, 2021, provisional application No. 63/153,398, filed on Feb. 25, 2021.

(51) Int. Cl.
*H02M 3/335*  (2006.01)
*H02M 1/00*  (2007.01)
*H02M 1/08*  (2006.01)

(52) U.S. Cl.
CPC ..... *H02M 3/33571* (2021.05); *H02M 1/0058* (2021.05); *H02M 1/083* (2013.01); *H02M 3/33592* (2013.01); *H02M 1/0009* (2021.05)

(58) Field of Classification Search
CPC ......... H02M 3/33571; H02M 3/33592; H02M 1/0058; H02M 1/083; H02M 1/0009
See application file for complete search history.

(56) References Cited

U.S. PATENT DOCUMENTS

| 5,959,850 | A  |   | 9/1999 | Lim |             |
|-----------|----|---|--------|-----|-------------|
| 7,016,204 | B2 | * | 3/2006 | Yang | H02M 3/33507 |
|           |    |   |        |     | 363/21.13   |

(Continued)

FOREIGN PATENT DOCUMENTS

CN          107196515 A   *   9/2017   ........ H02M 3/33523

*Primary Examiner* — Thienvu V Tran
*Assistant Examiner* — Yahveh Comas Torres
(74) *Attorney, Agent, or Firm* — Tung & Associates

(57) ABSTRACT

A flyback power converter includes: a first transistor switching a transformer for generating a primary switching current and an output voltage; and a second transistor generating a circulated current to achieve ZVS (zero voltage switching) of the first transistor; wherein the flyback power converter actively forces at least one switching cycle to be operated in a DCM (discontinuous conduction mode) operation when the primary switching current is determined to have been operating in a non-DCM operation for a predetermined number of switching cycles. The flyback power converter generates a demagnetized signal which emulates the demagnetized time of the transformer for controlling the second transistor during the non-DCM operation. The flyback power converter calibrates the demagnetized signal according to the demagnetized time during the actively fored DCM operation.

26 Claims, 13 Drawing Sheets

(56) References Cited

U.S. PATENT DOCUMENTS

| | | | |
|---|---|---|---|
| 7,151,681 B2 | 12/2006 | Yang et al. | |
| 7,349,229 B1 * | 3/2008 | Yang | H02M 3/33515 |
| | | | 363/21.16 |
| 9,065,350 B2 * | 6/2015 | Halberstadt | H02M 3/3376 |
| 2012/0176819 A1 * | 7/2012 | Gao | H02M 1/36 |
| | | | 363/21.12 |
| 2014/0307484 A1 * | 10/2014 | Yang | H02M 3/33569 |
| | | | 363/21.12 |
| 2016/0329814 A1 * | 11/2016 | Fahlenkamp | H02M 3/33523 |
| 2018/0294731 A1 * | 10/2018 | Song | H02M 3/33569 |
| 2018/0294734 A1 * | 10/2018 | Song | H02M 3/33592 |
| 2020/0036280 A1 * | 1/2020 | Yang | H02M 3/33592 |
| 2020/0280263 A1 * | 9/2020 | Lin | H02M 3/33592 |

\* cited by examiner

FLYBACK POWER CONVERTER HAVING EMULATED DEMAGNETIZED SIGNAL AND SWITCHING CONTROL CIRCUIT AND CONTROL METHOD THEREOF

CROSS REFERENCE

The present invention claims priority to following provisional applications, Ser. No. 63/230,419, filed on Aug. 6, 2021; provisional application Ser. No. 63/231,806, filed on Aug. 11, 2021; provisional application Ser. No. 63/153,398, filed on Feb. 25, 2021; provisional application Ser. No. 63/241,090, filed on Sep. 6, 2021, all of which applications are incorporated herein by their reference in their entirety.

BACKGROUND OF THE INVENTION

Field of Invention

The present invention relates to a flyback power converter; particularly, it relates to a resonant half-bridge flyback power converter with skipping cycles. The present invention also relates to a control method controlling resonant half-bridge flyback power converter.

Description of Related Art

FIG. 1 shows a prior art of U.S. Pat. No. 5,959,850 "Asymmetrical Duty Cycle Flyback Converter", which discloses a half-bridge flyback power converter with zero voltage switching (ZVS) for achieving the higher power efficiency. The ZVS can be defined as the transistor is switched on when the voltage across the transistor (e.g. drain-source voltage) is zero or close to zero. However, the drawback of this prior art is that the power efficiency during the light load of the power converter is low.

Another drawback of this prior art is the output voltage of the power converter cannot be variable. More specifically, a ZVS flyback power converter with the variable output voltage requires to detect the demagnetized time of the transformer for controlling the switching of the transformer.

Another prior art of U.S. Pat. No. 7,151,681 "Multiple-sampling circuit for measuring reflected voltage and discharge time of a transformer" shows a method to detect the output voltage and the demagnetized time of the transformer. However, this prior art power converter cannot achieve ZVS. It was developed for the DCM (discontinuous conduction mode) operation.

FIG. 2 shows waveforms of a prior art half-bridge power converter operating at DCM (discontinuous conduction mode) during the light load condition. A driving signal SH is coupled to drive a high-side switch of the half-bridge power converter for magnetizing the transformer. A driving signal SL is applied to drive a low-side switch of the half-bridge power converter. The magnetizing current IM shows the transformer operates in DCM. When the output power of the half-bridge power converter is decreased, the pulse width TW of the driving signal SH decreases in response to the feedback control of the half-bridge power converter. The pulse width of the driving signal SL also decreases accordingly. Therefore, the switching frequency of the half-bridge power converter increases, and the switching loss increases when the output power is decreased. After the driving signal SH turns to low (off), the first pulse of the driving signal SL is enabled during the demagnetizing period of the transformer. A second pulse of the driving signal SL is enabled to generate a circulated current for achieving ZVS of the high-side switch.

A drawback of this prior art is the driving signal SL thus toggles on/off twice during a switching cycle when operating in DCM, which further increases the average switching frequency of the driving signal SL and causes a significant switching loss and the heat at the low-side switch.

Compared to the prior art U.S. Pat. No. 7,151,681, the present invention provides a resonant half-bridge flyback power converter with skipping cycle to improve power efficiency for both the middle load and the light load operations.

Compared to the prior art U.S. Pat. No. 5,959,850, the present invention provides a method and a switching control circuit for generating a demagnetized signal, wherein the period of this demagnetized signal is equal to the demagnetized period of the transformer. It can be applied to the ZVS flyback power converter with programmable output voltage, such as the USB PD power converters.

Compared to the prior art shown in FIG. 2, the present invention provides a control circuit for the asymmetrical half-bridge (AHB) flyback power converter with three transistors to improve the power efficiency for both the middle load and the light load operations.

SUMMARY OF THE INVENTION

From one perspective, the present invention provides a flyback power converter comprising: a first transistor switching a transformer for generating a primary switching current and an output voltage; and a second transistor generating a circulated current to achieve ZVS (zero voltage switching) of the first transistor; wherein the flyback power converter actively forces at least one switching cycle to be operated in a DCM (discontinuous conduction mode) operation when the primary switching current is determined to have been operating in a non-DCM operation for a predetermined number of switching cycles.

In one preferred embodiment, the flyback power converter generates a demagnetized signal which emulates the demagnetized time of the transformer for controlling the second transistor during the non-DCM operation, wherein the flyback power converter calibrates the demagnetized signal according to the demagnetized time during the actively fored DCM operation.

In one preferred embodiment, in the actively fored DCM operation, the flyback power converter detects a reflected voltage from an auxiliary winding of the transformer for calibrating the demagnetized signal during the first transistor being off, wherein the period of the reflected voltage is related to the demagnetized time of the transformer.

In one preferred embodiment, the first transistor and the second transistor form a half-bridge circuit, wherein in the actively fored DCM operation, the second transistor is controlled to be off after first transistor is turned off, such that the half-bridge circuit operates in an asynchronous mode.

In one preferred embodiment, the flyback power converter further comprises a counter configured to operably count a number of switching cycles operating in the non-DCM operation and enable the actively fared DCM operation when the primary switching current has been operated in the non-DCM operation for a predetermined number of switching cycles.

In one preferred embodiment, a pulse period of the demagnetized signal is utilized to control a minimum on time of the second transistor for demagnetizing the transformer after turning off the first transistor.

In one preferred embodiment, a pulse period of the demagnetized signal is correlated to a level of an input voltage of the transformer during the magnetized time thereof, a level of the output voltage of the transformer and an on-time period of the first transistor.

In one preferred embodiment, the flyback power converter further comprises a resistor for generating the demagnetized signal; wherein the flyback power converter adjusts the resistance of the resistor to calibrate the demagnetized signal according to the demagnetized time of the transformer during the actively fored DCM operation.

In one preferred embodiment, a portion of a demagnetized current of the transformer flows through a body diode of the second transistor after turning off the first transistor during the actively fored DCM operation.

In one preferred embodiment, the flyback power converter is a resonant flyback power converter which further comprises a resonant capacitor connected in series with the transformer.

In one preferred embodiment, a first pulse of the second driving signal after the DCM operation turns on the second transistor to magnetize the transformer from the resonant capacitor to the transformer, such that a negative circulated current is generated to achieve ZVS for the first transistor.

From another perspective, the present invention provides a switching control circuit for controlling a flyback power converter, wherein the flyback power converter includes: a first transistor switching a transformer for generating a primary switching current and an output voltage; and a second transistor generating a circulated current to achieve ZVS (zero voltage switching) of the first transistor, the switching control circuit comprising: a control unit, configured to operably generate a first signal for controlling the first transistor and a second signal for controlling the second transistor according to a feedback signal which is related to the output voltage; and a cycle counter, configured to operably count a number of switching cycles operating in a non-DCM operation according to the primary switching current; wherein the control unit actively forces at least one switching cycle to be operated in a DCM (discontinuous conduction mode) operation when the primary switching current is determined to have been operating in the non-DCM operation for a predetermined number of switching cycles.

In one preferred embodiment, the switching control circuit further comprises a demagnetizing emulator configured to operably generate a demagnetized signal which emulates the demagnetized time of the transformer for controlling the second transistor during the non-DCM operation, wherein the demagnetizing emulator calibrates the demagnetized signal according to the demagnetized time during the actively fored DCM operation.

In one preferred embodiment, in the actively fored DCM operation, the demagnetizing emulator detects a reflected voltage from an auxiliary winding of the transformer for calibrating the demagnetized signal during the first transistor being off, wherein the period of the reflected voltage is related to the demagnetized time of the transformer.

In one preferred embodiment, the first transistor and the second transistor form a half-bridge circuit, wherein in the actively fored DCM operation, the second transistor is controlled to be off after first transistor is turned off, such that the half-bridge circuit operates in an asynchronous mode.

In one preferred embodiment, a pulse period of the demagnetized signal is utilized to control a minimum on time of the second transistor for demagnetizing the transformer after turning off the first transistor.

In one preferred embodiment, a pulse period of the demagnetized signal is correlated to a level of an input voltage of the transformer during the magnetized time thereof, a level of the output voltage of the transformer and an on-time period of the first transistor.

In one preferred embodiment, the switching control circuit further adjusts a resistance of a resistor coupled to the flyback power converter to calibrate the demagnetized signal according to the demagnetized time of the transformer during the actively fored DCM operation.

In one preferred embodiment, during the actively fored DCM operation, the control unit controls the second transistor to be off such that a portion of a demagnetized current of the transformer flows through a body diode of the second transistor after turning off the first transistor.

In one preferred embodiment, a first pulse of the second driving signal after the DCM operation turns on the second transistor to magnetize the transformer from the a resonant capacitor of the flyback power converter to the transformer, such that a negative circulated current is generated to achieve ZVS for the first transistor, wherein the resonant capacitor is connected in series with the transformer.

In one preferred embodiment, the demagnetizing emulator includes: an integration capacitor and a switch coupled to sample and hold a current sense signal which is related to the primary switching current; and a discharging circuit, configured to operably generate a discharging current related to the output voltage for discharging the integration capacitor; wherein the demagnetized signal is generated according to a voltage across the integration capacitor discharged by the discharging current from an end of magnetizing the transformer.

From another perspective, the present invention provides a control method for controlling a flyback power converter, wherein the flyback power converter includes: a first transistor switching a transformer for generating a primary switching current and an output voltage; and a second transistor generating a circulated current to achieve ZVS (zero voltage switching) of the first transistor, control method comprising: generating a first signal for controlling the first transistor and a second signal for controlling the second transistor according to a feedback signal which is related to the output voltage; counting a number of switching cycles operating in a non-DCM operation according to the primary switching current; actively forcing at least one switching cycle to be operated in a DCM (discontinuous conduction mode) operation when the primary switching current is determined to have been operating in the non-DCM operation for a predetermined number of switching cycles.

In one preferred embodiment, the control method further comprises: generating a demagnetized signal which emulates the demagnetized time of the transformer for controlling the second transistor during the non-DCM operation; and calibrating the demagnetized signal according to the demagnetized time during the actively fored DCM operation.

In one preferred embodiment, the step of calibrating the demagnetized signal includes: in the actively fored DCM operation, detecting a reflected voltage from an auxiliary winding of the transformer for calibrating the demagnetized signal during the first transistor being off, wherein the period of the reflected voltage is related to the demagnetized time of the transformer.

In one preferred embodiment, the first transistor and the second transistor form a half-bridge circuit, wherein the step of calibrating the demagnetized signal further includes: in the actively fored DCM operation, controlling the second transistor to be off after first transistor is turned off, such that the half-bridge circuit operates in an asynchronous mode.

In one preferred embodiment, the step of generating the first signal and the second signal includes: controlling a minimum on time of the second transistor according to a pulse period of the demagnetized signal for demagnetizing the transformer after turning off the first transistor.

In one preferred embodiment, a pulse period of the demagnetized signal is correlated to a level of an input voltage of the transformer during the magnetized time thereof, a level of the output voltage of the transformer and an on-time period of the first transistor.

In one preferred embodiment, the step of calibrating the demagnetized signal further includes: adjusting a resistance of a resistor coupled to the flyback power converter to calibrate the demagnetized signal according to the demagnetized time of the transformer during the actively fored DCM operation.

In one preferred embodiment, the control method further comprises: during the actively fored DCM operation, controlling the second transistor to be off such that a portion of a demagnetized current of the transformer flows through a body diode of the second transistor after turning off the first transistor.

In one preferred embodiment, the control method further comprises: turning on the second transistor by a first pulse of the second driving signal after the DCM operation to magnetize the transformer from the a resonant capacitor of the flyback power converter to the transformer, such that a negative circulated current is generated to achieve ZVS for the first transistor, wherein the resonant capacitor is connected in series with the transformer.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
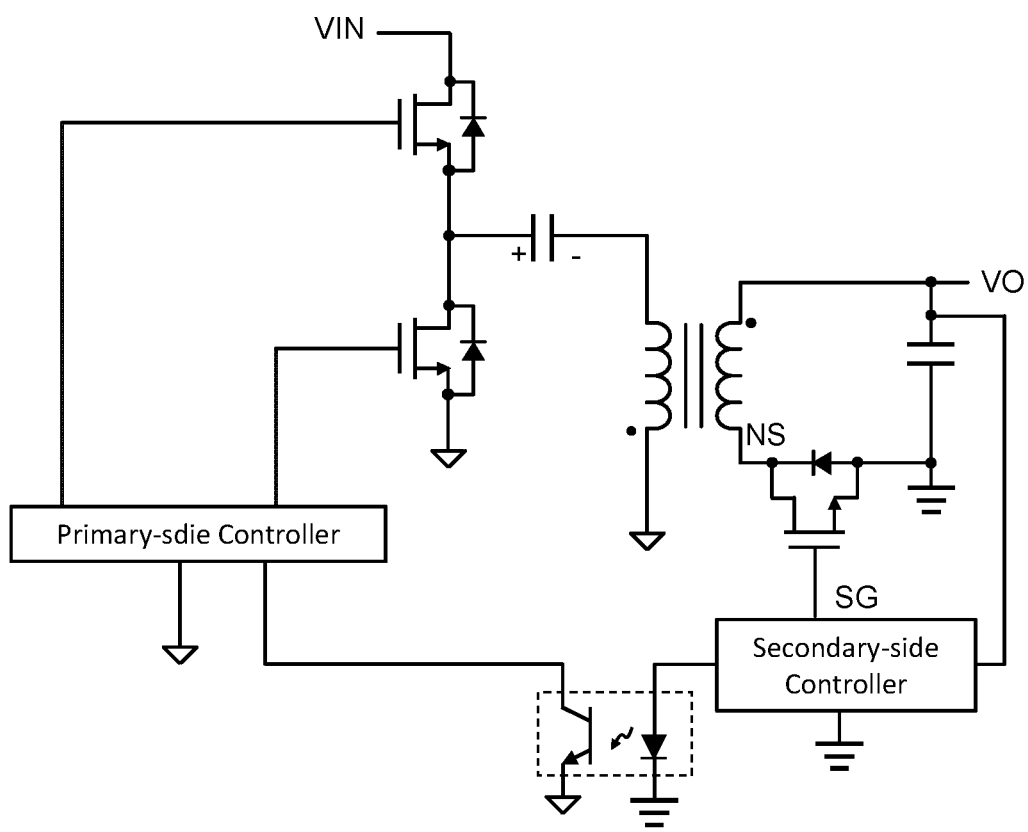
FIG. 1 shows a prior art flyback converter.
Figure 2:
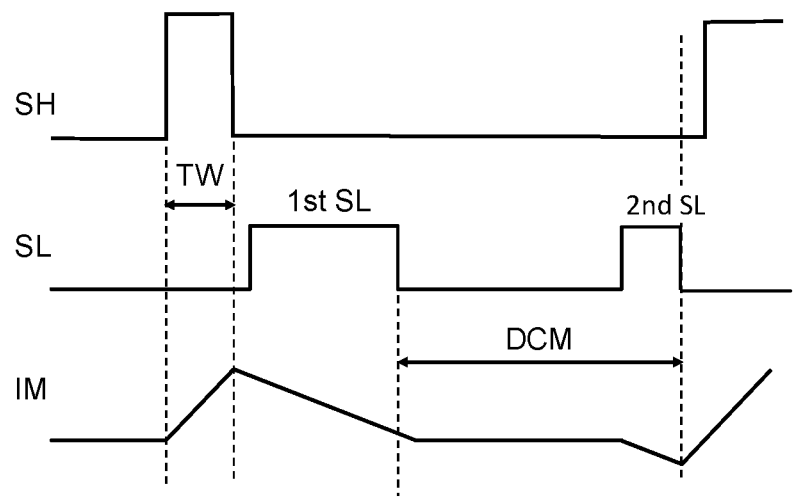
FIG. 2 shows waveforms of a prior art half-bridge power converter operating at DCM (discontinuous conduction mode) during the light load condition.
Figure 3:
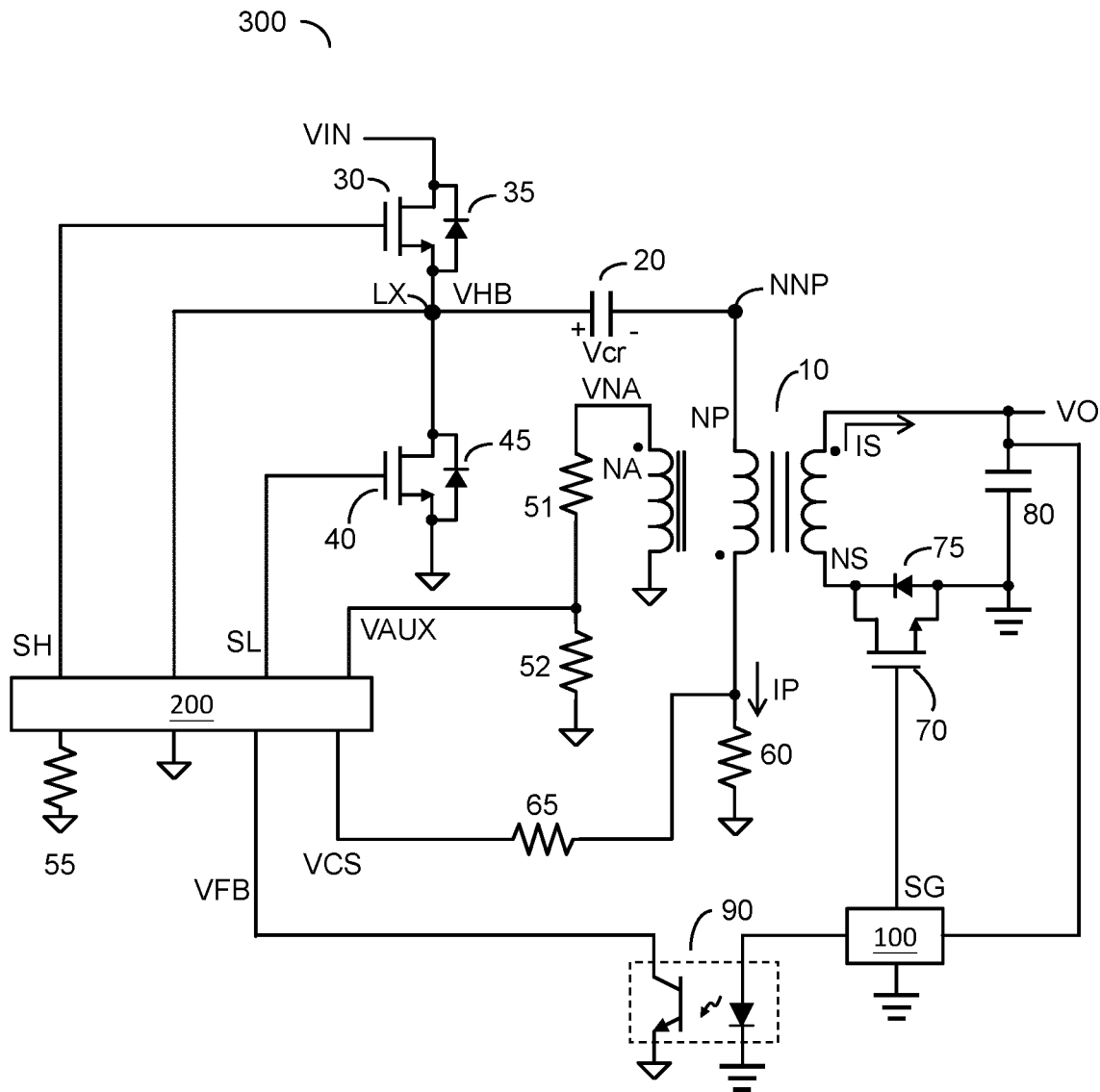
FIG. 3 shows schematic diagram of a preferred embodiment of a resonant half-bridge flyback power converter according to the present invention.

FIG. 3 shows schematic diagram of a preferred embodiment of a resonant half-bridge flyback power converter according to the present invention. The resonant half-bridge flyback power converter 300 includes a first transistor 30 and a second transistor 40 which form a half-bridge circuit. A transformer 10 and a resonant capacitor 20 connected in series is coupled to the switching node LX of the half-bridge circuit. The transformer 10 includes a primary winding NP, a secondary winding NS and an auxiliary winding NA. The primary winding NP and the secondary winding NS has a turn ratio n. The secondary winding NS and the auxiliary winding NA has a turn ratio m. A primary-side controller 200 generates a driving signal SH and a driving signal SL coupled to switch the transformer 10 through the half-bridge circuit for generating an output voltage VO at the secondary-side of the transformer 10. The driving signal SH drives the first transistor 30 to magnetize the transformer 10. The driving signal SL turns on the second transistor 40 during demagnetizing and the resonant period of the transformer 10. The driving signal SL also is applied to turn on the second transistor 40 for generating a circulating current through the transformer 10 and achieving ZVS for the first transistor 30. A resistor 60 is coupled to generate a current sense signal VCS by detecting a primary switching current IP of the power transformer 10.

The driving signal SH and the driving signal SL are generated in response to a feedback signal VFB according to the output power of the resonant half-bridge flyback power converter 300. A secondary controller 100 is coupled to the output voltage VO for generating the feedback signal VFB. The feedback signal VFB is further coupled to the primary-side controller 200 through an opto-coupler 90. The secondary controller 100 also generates a driving signal SG for driving the synchronous rectifier 70 during the demagnetizing period TDS of the transformer 10. The auxiliary winding NA generates an auxiliary winding signal during the switching of the transformer 10. Resistors 51, 52 further attenuate the auxiliary winding signal VNA for producing an auxiliary signal VAUX connected to the primary-side controller 200. In one embodiment, a resistor 55 connected to the primary-side controller 200 is applied to set the parameter for generating a demagnetized signal Sdmg.

Figure 4:
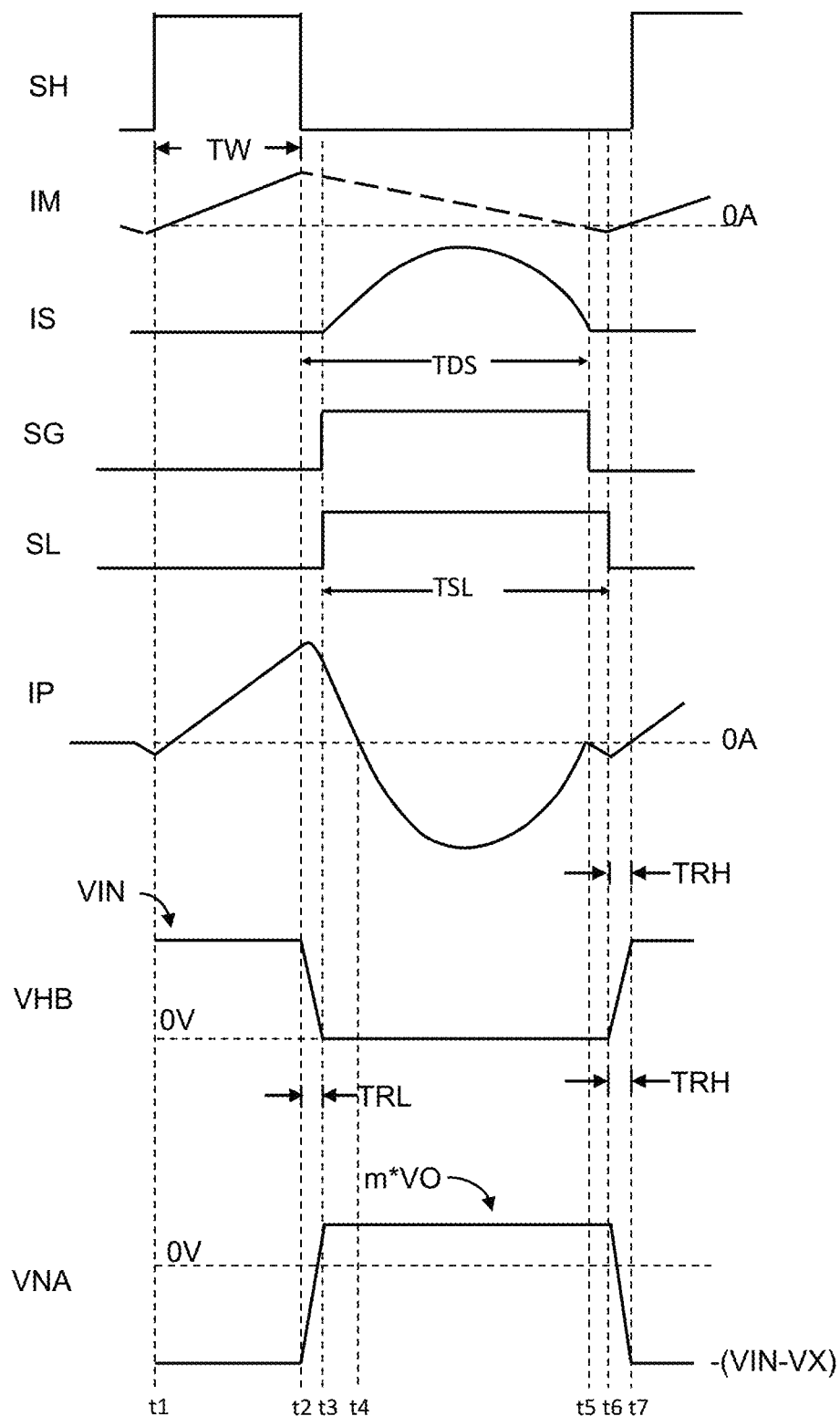
FIG. 4 shows operating waveforms corresponding to the embodiment shown in FIG. 3.

FIG. 4 shows operating waveforms corresponding to the embodiment shown in FIG. 3. The transformer 10 is magnetized and a magnetizing current IM is generated when the driving signal SH is turned on. The transformer 10 is demagnetized when the driving signal SH is turned off. The transformer 10 generates a secondary switching current IS during the demagnetizing period TDS. The period of the driving signal SL is related to the demagnetizing period TDS of the transformer 10. In one embodiment, the period TSL (i.e. the pulse width) of the driving signal SL is configured to be equal to or longer than the demagnetizing period TDS of the transformer 10 to prevent the transformer 10 from operating in continuous conduction mode (CCM). A reflected voltage VX is generated in the resonant capacitor 20 during the demagnetizing period TDS of the transformer 10, wherein VX=n*VO.

The driving signal SL can be turned on when the driving signal SH is turned off. The driving signal SH can be turned on when the driving signal SL is turned off. Dead time periods (e.g. TRH and TRL) can be included in between the driving signal SH and the driving signal SL.

Operations during different time periods shown in FIG. 4 are explained in the following sections.

The period from t1 to t2 indicates a magnetized transformer cycle. The first transistor 30 is on and the second transistor 40 is off. The current IP increases in the transformer 10 and the voltage in the resonant capacitor 20 increases. The transformer 10 is magnetized and the resonant capacitor 20 is charged. The secondary synchronous rectifier 70 is off and the body diode 75 of the secondary synchronous rectifier 70 is biased inversely. Hence no energy is transferred to the secondary side.

The period from t2 to t3 indicates a first circulated current cycle. Both the first transistor 30 and the second transistor 40 are off. The circulated current of the transformer 10 will force the switching node voltage VHB of the half-bridge circuit to drop until the body diode 45 of the second transistor 40 is turned on. The time period from t2 to t3 is related to a quasi-resonant period for achieving ZVS of the second transistor 40. The primary side of the transformer 10 now has the same voltage as the resonant capacitor 20 at t3.

The period from t3 to t4 indicates a resonant cycle (positive current). The first transistor 30 is off and the second transistor 40 is turned on under the ZVS condition. The output voltage VO equals to the voltage Vcr across the resonant capacitor 20 divided by the turn ratio n. The current starts flowing through the secondary synchronous rectifier 70, the energy stored in the transformer 10 is transferred to the output to generate the output voltage VO. Because the LC tank is formed by the leakage inductance Lr of the transformer 10 and the resonant capacitor 20 (Cr), the secondary current follows a sine-wave with the period determined by the resonant frequency of Lr and Cr. The current in the primary side of the transformer 10 is the sum of the magnetizing current IM plus the reflected secondary current IS. The current in the resonant tank (Lr, Cr) is still positive, mainly driven from the magnetizing inductance of the transformer 10, and flows into the resonant capacitor 20.

The period from t4 to t5 indicates a resonant cycle (negative current). The first transistor 30 is off and the second transistor 40 is turned on continuously. The energy is still being transferred to the secondary side, but the resonant tank current inversely driven by the voltage in the resonant capacitor 20. The energy of the resonant capacitor 20 is not only transferred to the secondary side, but also utilized to bring the magnetizing current of the transformer 10 to a negative level when the second transistor 40 is continuously turned on (e.g. t4-t5).

The period from t5 to t6 indicates a backward magnetized transformer cycle (negative current). The backward magnetized transformer cycle is started from the end of demagnetizing period TDS of the transformer 10 to the second transistor 40 is off. The resonant capacitor 20 will inversely magnetize the transformer 10 and generate the negative current.

The period from t6 to t7 indicates a second circulated current cycle. Both the first transistor 30 and the second transistor 40 are off. The negative current induced in the transformer 10 during t5 to t6 forces the voltage VHB at the switching node LX of the half-bridge circuit to increase until it turns on the body diode 35 of the first transistor 30.

After the time point t7, another cycle starts similar with t1 to t2, wherein the first transistor 30 is turned on with the ZVS condition and the second transistor 40 is off. If the circulated current in the transformer resonant tank is still negative, the excess of energy in the tank will be sent back to the input VIN.

Under light load conditions, the pulse width of the driving signal SH and the driving signal SL are decreased in response to the decrease of the output power. The switching frequency of the driving signal SH and the driving signal SL are thus increased in the light load condition. Therefore, the power efficiency of the power converter becomes poor because the power losses such as the core loss, the switching loss, etc. are increased.

Figure 5:
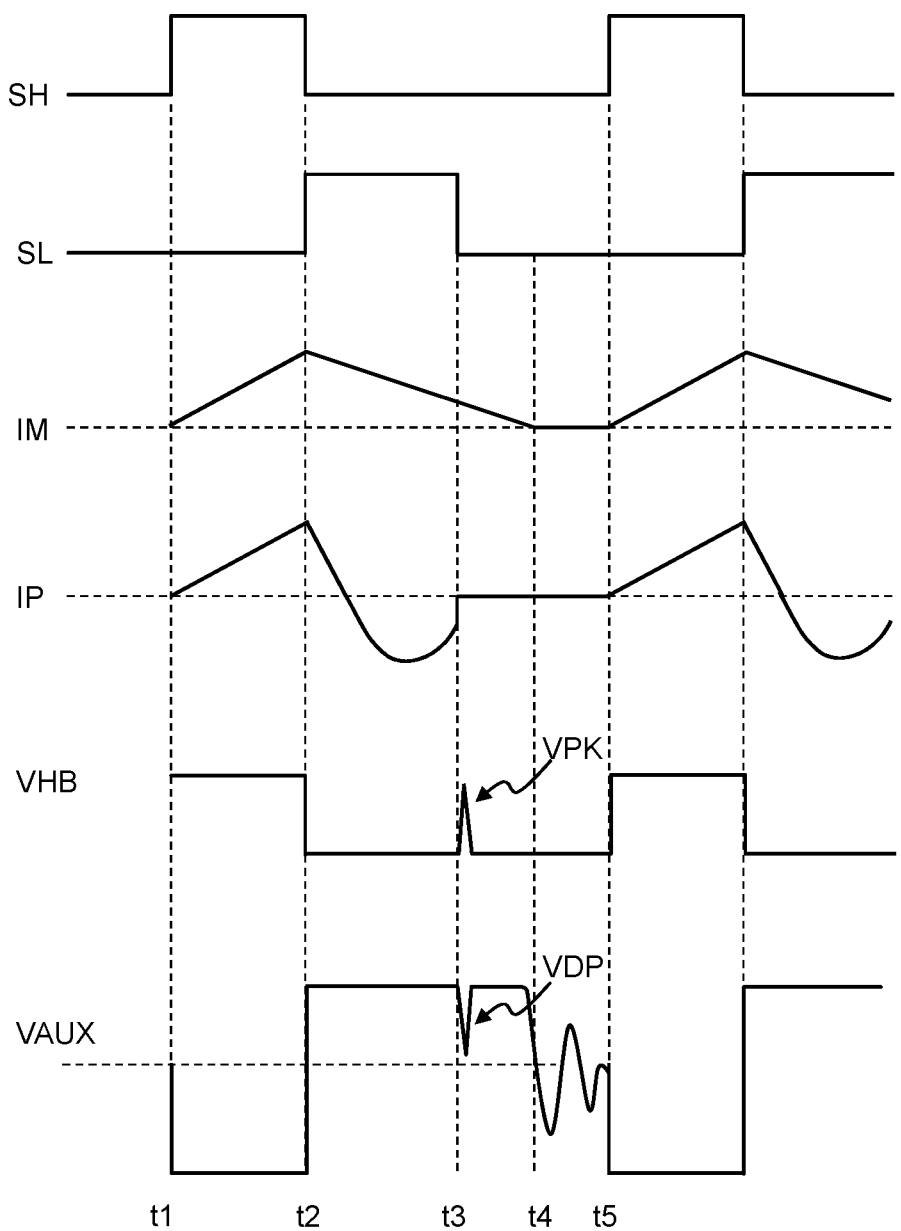
FIG. 5 shows waveforms of decreasing the switching frequency of the driving signals.

FIG. 5 shows waveforms of decreasing the switching frequency of the driving signal SH and the driving signal SL. Reducing the switching frequency by extending the period in between the turn-off of the driving signal SL (e.g. t3) to the turn-on of the driving signal SH (e.g. t5) is a solution to improve the power efficiency. However, the turn-off of the driving signal SL will generate the circulating current that causes a voltage spike VPK at the switching node voltage VHB and a voltage drop VDP at the auxiliary signal VAUX. The voltage spike VPK and the voltage drop VDP cause the power loss and noise.

Note that the aforementioned turn-on or turn-off of the driving signal SH or the driving signal SL indicates the states of correspondingly turning on or turning off the first transistor 30 or the second transistor 40 respectively.

Figure 6:
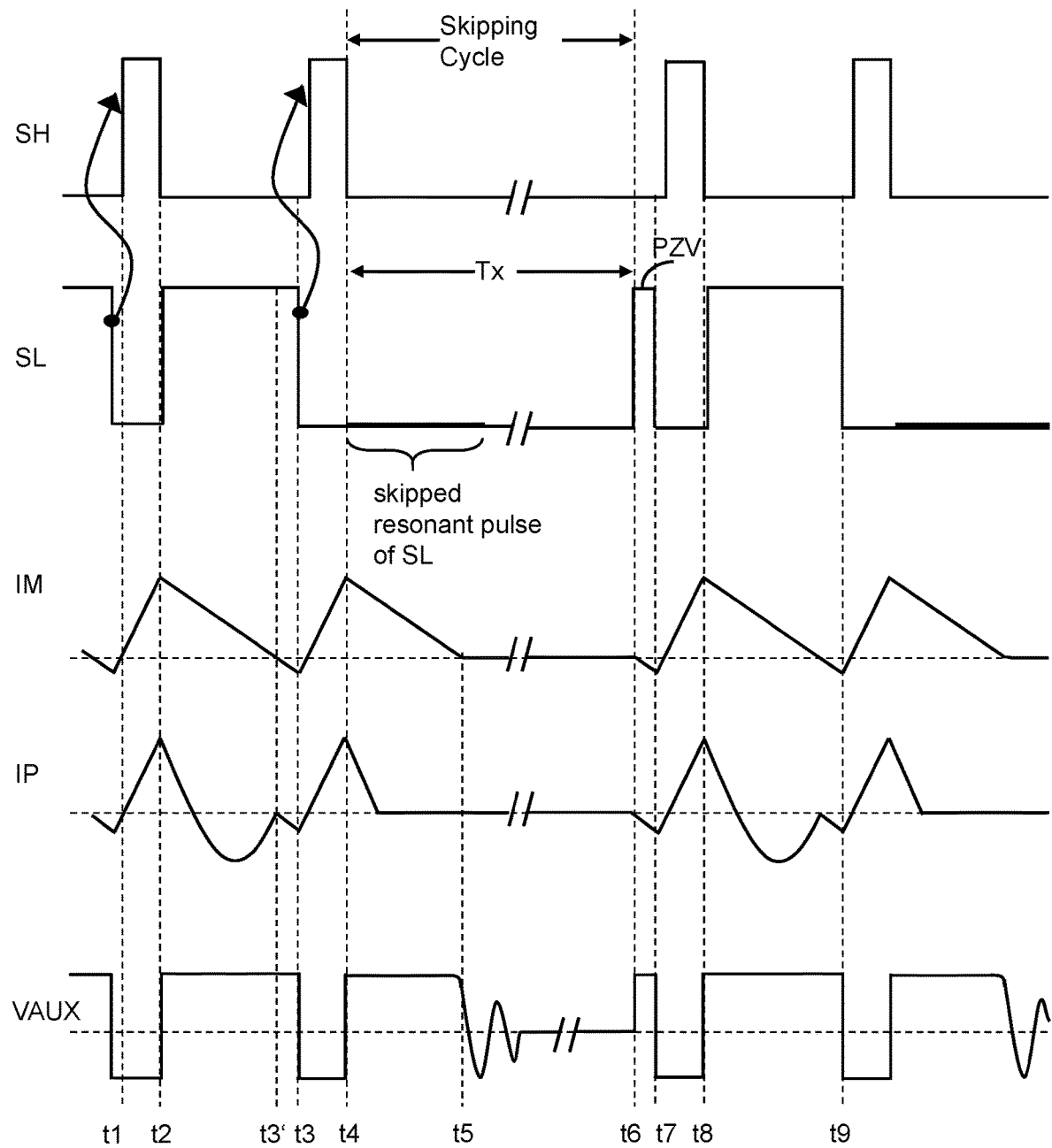
FIG. 6 shows operating waveforms of one embodiment of the resonant half-bridge flyback power converter with skipping cycle according to the present invention.

FIG. 6 shows operating waveforms of one embodiment of the resonant half-bridge flyback power converter with skipping cycle according to the present invention.

Referring to FIG. 6, in one embodiment, the first drying signal SH turns on during the magnetizing cycle (e.g. t1-t2) to magnetize the transformer 10. The driving signal SL turns on with a resonant pulse (e.g. t2-t3) following the turn-off of the first drying signal SH during the resonant cycle (e.g. t2-t3). One magnetizing cycle and one resonant cycle form a switching cycle (e.g. t1-t3).

Referring to FIG. 6, in one embodiment, a skipping cycle period Tx is started at the turn-off of the driving signal SH (e.g. t4), and the driving signal SL will turn on once the skipping cycle period Tx is expired (e.g. t6). In one embodiment, the period of the skipping cycle period Tx will be increased (i.e. the switching frequency is decreased) in response to the decrease of the output power for power saving.

Still referring to FIG. 6, compared to the cycle without skipping, e.g. t1 to t3, the driving signal SL is not turned on for a resonant pulse in the skipping cycle (e.g. during Tx). For example, a pulse which could have existed from t4 to t5 of the driving signal SL in prior art, i.e. the resonant pulse of SL, is skipped in this embodiment, as noted in FIG. 6. Therefore, no negative circulating current will be generated in the skipping cycle period (t4-t6). The voltage spike VPK generated at the switching node voltage VHB and the voltage drop VDP generated at the auxiliary signal VAUX in the aforementioned prior art can be avoided. In one embodiment, as shown in FIG. 6, the driving signal SH is not turned on in the skipping cycle (e.g. during Tx), either.

In one embodiment, after the turn-off of the driving signal SH, a portion of the demagnetized current of the transformer 10 flows through the body diode 45 of the second transistor 40 during some portion of the skipping cycle period (e.g. during some portion between t4-t5). In other words, in one embodiment, there are no double pulses generated in the driving signal SL. In one embodiment, there are no double pulses generated in the driving signal SH, either. From one perspective, it will be one pulse of the driving signal SH followed by one pulse of the driving signal SL, and one pulse of the driving signal SL followed by one pulse of the driving signal SH, even when the resonant half-bridge flyback power converter is operated with a skipping cycle. From another perspective, the driving signal SL includes at most one pulse between two consecutive pulses of the driving signal SH, and the driving signal SH includes at most one pulse between two consecutive pulses of the driving signal SL.

In one embodiment, the skipping cycle period Tx is generated when the output power is lower than a predetermined threshold. In one embodiment, the skipping cycle period Tx is increased in response to the decrease of the output power. In one embodiment, the second driving signal does not include a second pulse for achieving ZVS of the first transistor 30 between two consecutive pulses of the first driving signal, even if the driving signal SL cannot achieve zero voltage switching for the first transistor 30.

Still referring to FIG. 6, in one embodiment, a ZVS pulse (e.g. PZV) of the driving signal SL will turn on the second transistor 40 for achieving the ZVS cycle (e.g. t6-t7) after the skipping cycle.

As shown in FIG. 6, in one embodiment, at least one switching cycle (e.g. t7-t9) starts after the skipping cycle period, following the ZVS pulse PZV.

Still referring to FIG. 6, in one embodiment, a resonant cycle can include an extended ZVS period (e.g. t3'-t3) for achieving ZVS of the first transistor 30. In other words, in this embodiment, a first portion of the resonant pulse (e.g. t2-t3') achieves the resonance of the transformer 10 and the resonant capacitor 20, and the second portion of the resonant pulse (e.g. t3'-t3) generates a circulated current for achieving the ZVS of the first transistor 30.

Figure 7:
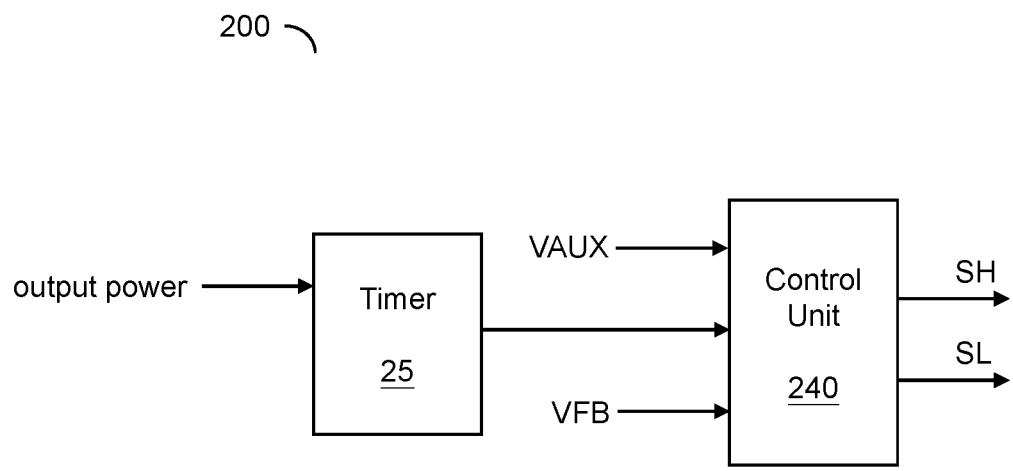
FIG. 7 shows a block diagram of one embodiment of the primary-side controller of the resonant half-bridge flyback power converter according to the present invention.

FIG. 7 shows a block diagram of one embodiment of the primary-side controller of the resonant half-bridge flyback power converter according to the present invention. In one embodiment, the primary-side controller 200 includes a timer 25 and a control unit 240. In one embodiment, the control unit 240 is configured to generate the driving signal SH and the driving signal SL according to the input voltage VIN (through VAUX) and the feedback signal VFB. The timer 25 is configured to operably generate the aforementioned skipping cycle period Tx.

As shown in FIG. 7, in one embodiment, the timer 25 receives information related to the output power to determine whether the output power is lower than a predetermined threshold or not. When the output power is judged to be lower than the predetermined threshold, the timer 25 starts to count the skipping cycle period Tx and controls the control unit 240 to skip the pulses of the driving signal SH and the driving signal SL during the skipping cycle period Tx.

Please refer back to FIG. 4. During middle load and light load conditions of the resonant half-bridge flyback power converter, the period of the resonant cycle of t4-t5 is short, it may not generate the sufficient negative current (energy) to achieve the ZVS. Therefore, the major part of the negative current will be relied on the current generated in the cycle of t5-t6.

However, a high negative current will cause a higher power loss. In order to control a proper level of the negative current for ZVS, an accurate demagnetized time control is needed. Thus, it is required to generate a demagnetized signal Sdmg correlated to the demagnetized time TDS of the transformer 10.

Figure 8:
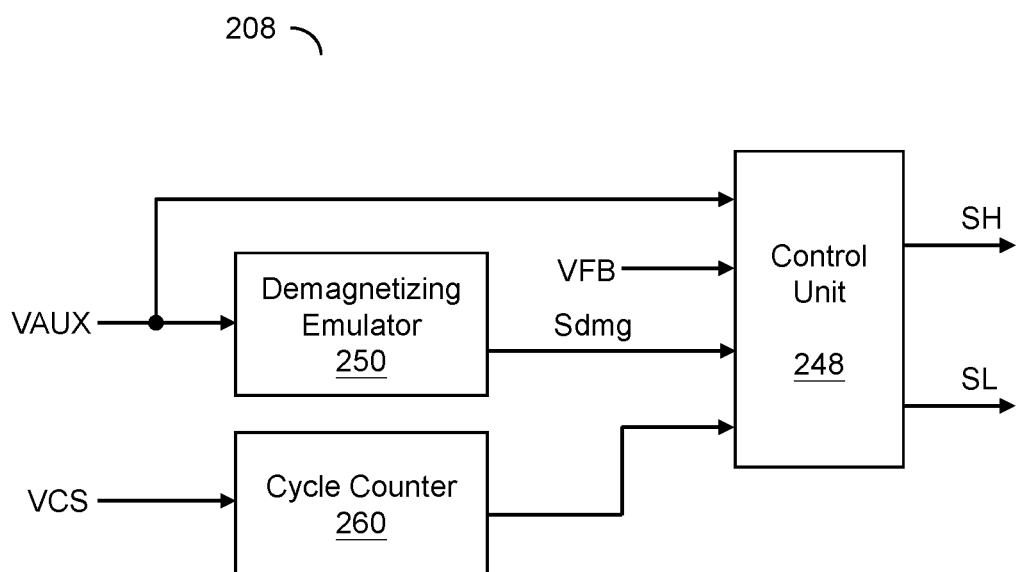
FIG. 8 shows a block diagram of one embodiment of the primary-side controller of the resonant half-bridge flyback power converter according to the present invention.

FIG. 8 shows a block diagram of one embodiment of the primary-side controller of the resonant half-bridge flyback power converter according to the present invention. In one embodiment, the primary-side controller 208 includes a demagnetizing emulator 250 and a control unit 248. In one embodiment, the control unit 248 is configured to generate the driving signal SH and the driving signal SL according to the input voltage VIN (e.g. through VAUX) and the feedback signal VFB. The demagnetizing emulator 250 is configured to generate a demagnetized signal Sdmg for emulating the demagnetized time TDS according to a demagnetizing related signal, such as a reflected voltage (e.g. through VAUX) of the transformer 10.

Figure 9:
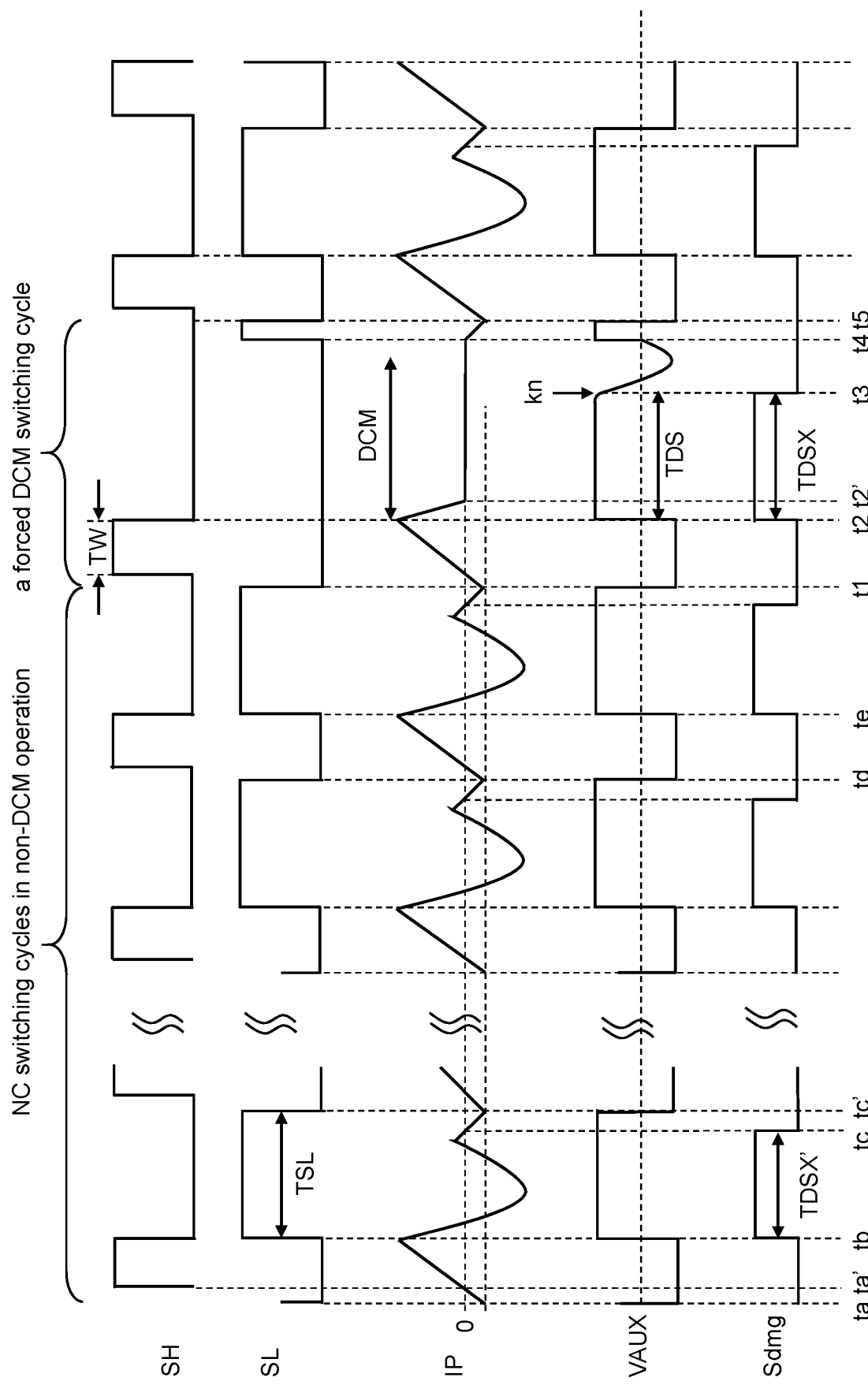
FIG. 9 which shows operating waveforms of the demagnetizing emulator for generating the demagnetized signal Sdmg according to the present invention.

Also refer to FIG. 9 which shows operating waveforms of the demagnetizing emulator for generating the demagnetized signal Sdmg according to the present invention.

During a switching cycle wherein the resonant half-bridge flyback power converter is periodically operated in a non-DCM operation (e.g. ta-tc'), the driving signal SH firstly turns on the first transistor 30 to magnetize the transformer 10 for generating the primary switching current IP (e.g. ta'-tb). After the first transistor 30 is turned off, the driving signal SL turns on (e.g. tb-tc') the second transistor 40 for a resonant cycle (tb-tc), and for generating a circulated current (e.g. tc-tc') to achieve ZVS of the first transistor 30. During a switching cycle in a non-DCM operation, the on period TSL (e.g. tb-tc') of the driving signal SL is determined by the pulse width (e.g. TDSX') of the demagnetized signal Sdmg generated by the demagnetizing emulator 250 according to the calibration during a previous deliberately inserted DCM operation. In one embodiment, the on period TDSX' of the demagnetized signal Sdmg, which is calibrated in a previous actively forced DCM operation, is provided to the control unit 248 to control the minimum on time of the second transistor 40 for demagnetizing the transformer 10 after the turn-off of the first transistor 30 during the non-DCM operation. In one embodiment, as shown in FIG. 9, the on period TSL (e.g. tb-tc') of the driving signal SL can be the on period TDSX' of the demagnetized signal Sdmg plus a delay time (e.g. tc-tc'), so as to establish the negative circulated current on the primary current IP after the demagnetized period for achieving ZVS of the first transistor 30.

Note that non-DCM is referred to as an operation mode which is not DCM, such as CCM (continuous conduction mode) or QRM (quasi-resonant mode) operation, wherein QRM is also known as BCM (boundary conduction mode).

In one embodiment, once the primary switching current IP has been operated in a non-DCM operation (e.g. quasi-resonant mode) for over a predetermined number (e.g. NC, a positive integer) of switching cycles (e.g. ta-t1), at least one switching cycle is actively forced to operate in DCM operation (e.g. t1-t3). Thus, the demagnetizing emulator 250 can calibrate the period TDSX of the demagnetized signal Sdmg according to the demagnetized time TDS of the transformer 10 during the deliberately inserted DCM operation.

As shown in FIG. 9, during the delibratedly inserted DCM operation, the demagnetized time TDS of the transformer 10 is started from the rising edge of the auxiliary signal VAUX to the falling edge (i.e. knee point kn) of the auxiliary signal VAUX (i.e. t2-t3). More specifically, in this embodiment, the reflected voltage can be detected by sensing the auxiliary signal VAUX from the auxiliary winding NA of the transformer 10 during a switch-off period the first transistor 30. The period of the reflected voltage, i.e. the pulse width of the auxiliary signal VAUX from the rising edge to the knee point kn, is related to the demagnetized time TDS of the transformer 10.

In one embodiment, the primary-side controller 208 further includes a cycle counter 260 which is configured to count the switching cycles operating in non-DCM operation according to the primary switching current IP, and to control the control unit 248 to actively force the DCM operation when the primary switching current IP is determined not operated in DCM over a predetermined number of switching cycles. In one embodiment, the cycle counter 260 can determine a non-DCM operation by sensing the primary switching current IP through the current sensing signal VCS.

In one embodiment, as shown in FIG. 9, during the forced DCM switching cycle, the driving signal SL keeps controlling the second transistor 40 to be off such that the half-bridge circuit operates not only in DCM operation, but also in asynchronous switching mode, wherein a portion of the demagnetized current (e.g. IP from t2-t2') of the transformer 10 flows through the body diode 45 of the second transistor 40 during the forced DCM switching cycle.

Still referring to FIG. 9, the first pulse of the driving signal SL after DCM (e.g. t4-t5) turns on the second transistor 40 to magnetize the transformer 10 from the resonant capacitor 20 to the transformer 10 and to generate a negative circulated current (e.g. IP during t4-t5) that achieves ZVS for the first transistor 30.

Figure 10:
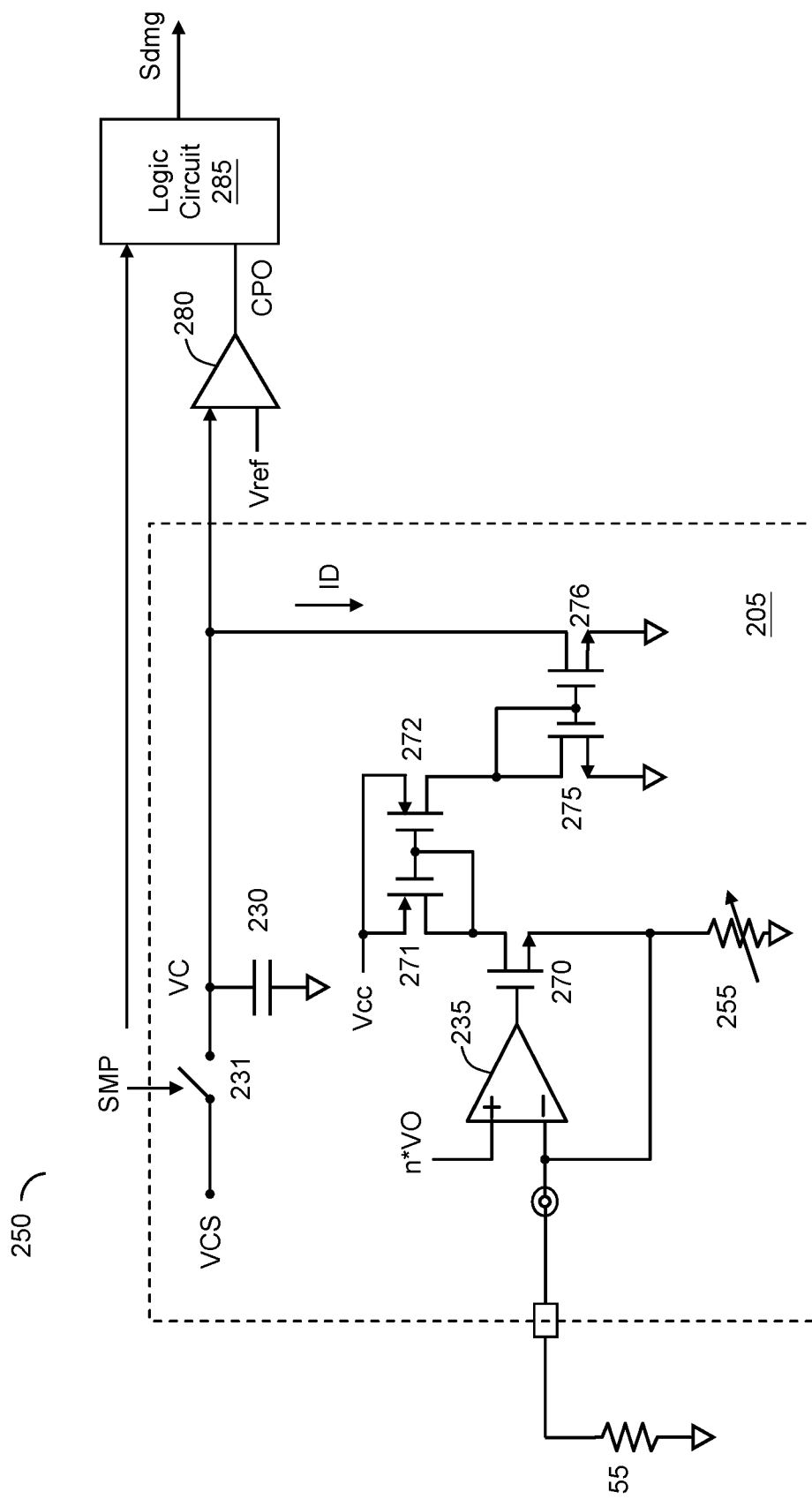
FIG. 10 shows a schematic diagram of one specific embodiment of the demagnetizing emulator that generates the demagnetized signal according to the present invention.

FIG. 10 shows a schematic diagram of one specific embodiment of the demagnetizing emulator that generates the demagnetized signal Sdmg. In one embodiment, the demagnetizing emulator 250 includes a timing generator 205, a comparator 280 and a logic circuit 285.

In one embodiment, the timing generator 205 includes an integrator formed by a switch 231 and a capacitor 230. The switch 231 is controlled by a sampling signal SMP that is correlated to the first signal SH for sampling a current sense signal VCS. A discharging current ID related to n*VO is configured to discharge a voltage VC across the capacitor 230. The voltage VC is compared to a reference voltage Vref by the comparator 280. The logic circuit 285 generates the demagnetized signal Sdmg according to the comparison output CPO and the sampling signal SMP that is correlated to the first signal SH. In one embodiment, the reference voltage Vref is 0V, provided the current sense voltage VCS is 0V when the primary switching current IP is 0.

In one embodiment, the period of the demagnetized signal Sdmg is correlated to the level (Vinx) of the input voltage of the transformer 10 (i.e. the voltage on the node NNP where the primary winding NP being coupled to the resonant capacitor 20 as shown in FIG. 3), the level of the output voltage (e.g. n*VO) of the transformer 10 and the magnetized period (TW) of the transformer 10 during the on period of the first transistor 30. Note that the level Vinx of the input voltage of the transformer 10 is equal to the input voltage VIN subrated from the cross voltage Vcr of the resonant capacitor 20.

Equation 1 is derived according to the equality between the magnet flux demagnetized of the transformer 10 and the magnet flux magnetized of the transformer 10 as the following:

$$Vinx * TW = n * VO * TDS \quad \text{(Eq. 1)}$$

where TW is the period of the voltage Vinx applied on the transformer 10 during the magnetizing period of the transformer 10; n*VO is the voltage applied to the transformer 10 during the demagnetized time TDS of the transformer 10. The number n is the turn ratio of the primary winding NP and the secondary winding NS. VO is the voltage of the secondary winding NS (i.e. the output voltage).

After the transformer 10 is magnetized, the level VCSp of the current sense signal VCS, which is related to the peak of the primary switching current IP at the end of magnetization and is generated on a resistor 60 as shown in FIG. 3, can be derived as equation 2:

$$VCSp = (Vinx/L) * TW * Rs \quad \text{(Eq. 2)}$$

where L is the inductance of the primary winding NP of the transformer 10, Rs is the resistance of the resistor 60, and VCSp is the voltage level at the end of the magnetization of the transformer 10.

Let ID=n*VO/Rt; where Rt is the resistance of the resistor 55.

The pulse width TDSX of the demagnetized signal Sdmg can be derived as:

TDSX=(C*VCSp)/ID; where C is the capacitance of the capacitor 230.

$$TDSX = (RT * C * VCSp/(n * VO)$$
$$TDSX = (RT * C/(n * VO)) * (Rs/L) * Vinx * TW$$
$$\text{Set } Rt = L/(Rs * C) \quad \text{(Eq. 3)}$$
$$TDSX = (Vinx * TW) = /(n * VO) \quad \text{(Eq. 4)}$$

Once the equation 3 is satisfied, the period TDSX of the demagnetized signal Sdmg shown in the equation 4 is equal to the demagnetized time TDS of the transformer 10.

Still referring to FIG. 10, the switch 231 is turned on for sampling the current sense signal VCS to the capacitor 230, and the level VCSp of the current sense signal VCS is held on the capacitor 230 at the turn-off of the switch 231 (i.e. the end of magnetizing). The switch 231 is controlled by the sampling signal SMP. The demagnetized signal Sdmg is enabled (for example by the logic circuit 285) when the switch 231 is turned off. In other words, the voltage VC of the capacitor 230 at the start of the demagnetized signal Sdmg is the peak of the current sense signal VCS. After the switch 231 is turned off, the current ID starts to discharge the capacitor 230. The demagnetized signal Sdmg is disabled when the capacitor 231 is fully discharged (VC=0V) by the discharging current ID (where ID=n*VO/Rt). The resistor 55, as shown in FIG. 10 and FIG. 3, is configured for setting a predetermined pulse width of the demagnetized signal Sdmg.

In one embodiment, during the deliberately inserted DCM switching cycle, the pulse width TDSX of the demagnetized signal Sdmg can be compared to the demagnetized time TDS indicated by the pulse width of the auxiliary signal VAUX by the demagnetizing emulator 250. Thus, the pulse width TDSX of the demagnetized signal Sdmg can be calibrated for use in the coming non-DCM switching cycles. In one embodiment, the demagnetizing emulator 250 further adjusts the resistance of the resistor 255 according to the demagnetized time TDS detected during the DCM operation to calibrate the period TDSX of the demagnetized signal Sdmg.

In other embodiments, other than adjusting the resistor 255, the demagnetizing emulator 250 can be configured to calibrate the period TDSX of the demagnetized signal Sdmg by adjusting the threshold voltage Vth for determining the end of the demagnetized signal Sdmg, or by adjusting the capacitance of the capacitor 230, or by adjusting the ratio of the current mirror circuit for example formed by the transistors 271 and 272 as shown in FIG. 10.

Figure 11:
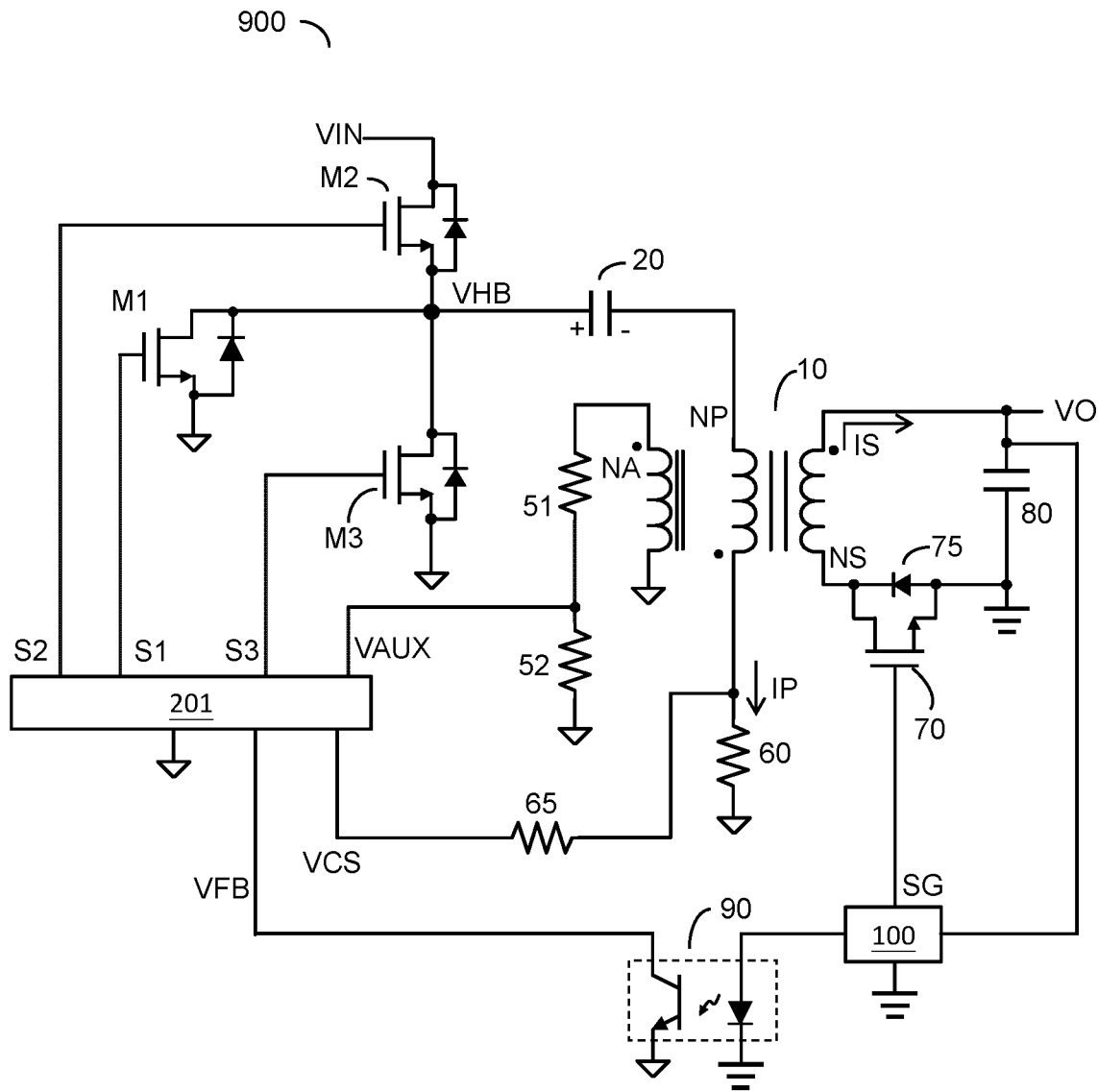
FIG. 11 shows a preferred embodiment of the resonant half-bridge flyback power converter according to the present invention.

FIG. 11 shows a preferred embodiment of the resonant half-bridge flyback power converter according to the present invention. The resonant half-bridge flyback power converter 900 is similar to the resonant half-bridge flyback power converter 300. In this embodiment, the resonant half-bridge flyback power converter 900 includes a first transistor M1, a second transistor M2 and a third transistor M3 which are configured to form a half-bridge circuit. From a perspective, the first transistor M1 and the third transistor M3 are configured as low-side transistors of the half-bridge flyback power converter 900, and the second transistor M2 is configured as a high-side transistor of the half-bridge flyback power converter 900.

According to a feedback signal VFB and the input voltage VIN, a primary-side controller 201 generates a first driving signal S1, a second driving signal S2 and a third driving signal S3 coupled to switch the transformer 10 through the half-bridge circuit for generating an output voltage VO at the secondary-side of the transformer 10. The second driving signal S2 drives the second transistor M2 to magnetize the transformer 10. The third driving signal S3 turns on the third transistor M3 during demagnetizing and the resonant period of the transformer 10. The third driving signal S3 also is applied to turn on the third transistor M3 for generating the circulated current through the transformer 10 and achieving ZVS for the second transistor M2 during the heavy load condition. In other words, the second transistor M2 is the primary high side switch of the resonant half-bridge flyback power converter 900 and can be corresponded to the transistor 30 in FIG. 3. The third transistor M3 is the primary low side switch of the resonant half-bridge flyback power converter 900 and can be corresponded to the transistor 40 in FIG. 3. From one perspective, the first transistor M1 is configured as an auxiliary primary low side switch in parallel with the transistor M3, with an independent control signal S1.

In one embodiment, during the DCM operation in light load condition, after the transformer 10 is magnetized by turning on the second transistor M2, the third transistor M3 is controlled to be on during demagnetizing and the resonant period of the transformer 10. After demagnetizing, the first driving signal S1 is applied to turn on the first transistor M1, while the third transistor M3 being kept off, for generating the circulated current through the transformer 10 and achieving ZVS for the second transistor M2. Therefore, the third transistor M3 will not switch twice during one switching cycle during DCM.

Since the first transistor M1 is configured for generating the circulated current for ZVS only, in one embodiment, the physical size (e.g. the ratio of the width to the length) of the first transistor M1 can be configured much smaller than the physical size of the third transistor M3. Therefore, the driving capability and the parasitic capacitance (for example gate capacitance) of the first transistor M1 is lower than the parasitic capacitance of the third transistor M3. The switching loss of first transistor M1 is thus lower than the switching loss of the third transistor M3.

For example, the gate switching loss Pg of a transistor can be expressed as:

$$Pg = 0.5 * Ciss * Vg * Vg * Freq$$

where Ciss is the input capacitance of the transistor. Vg is the voltage level of the gate driver signal. Freq is the switching frequency of the gate driving signal.

From the switching power loss equation as above, the gate switching loss of the first transistor M1 having a smaller physical size, which is dedicated for achieving ZVS for the second transistor M2 during the DCM, is lower than that of the third transistor M3 having a larger physical size.

In addition, in one embodiment, an amplitude of the voltage level (i.e. Vg) of the first driving signal S1 is lower than an amplitude of the voltage level of the third driving signal S3, which can further reduce switching loss of the first transistor M1. Furthermore, in one embodiment, agate related maximum rating (e.g. gate-source voltage) of the first transistor M1 can be lower than that of the third transistor M3.

A resistor 60 is coupled to generate a current sense signal VCS by detecting a primary switching current IP of the power transformer 10. The primary-side controller 201 generates the first driving signal S1 according to the input voltage VIN, and generates the third driving signal S3 according to the input voltage VIN and/or the output voltage VO. The primary-side controller 201 further generates the second driving signal S2 according to the feedback signal VFB.

Figure 12:
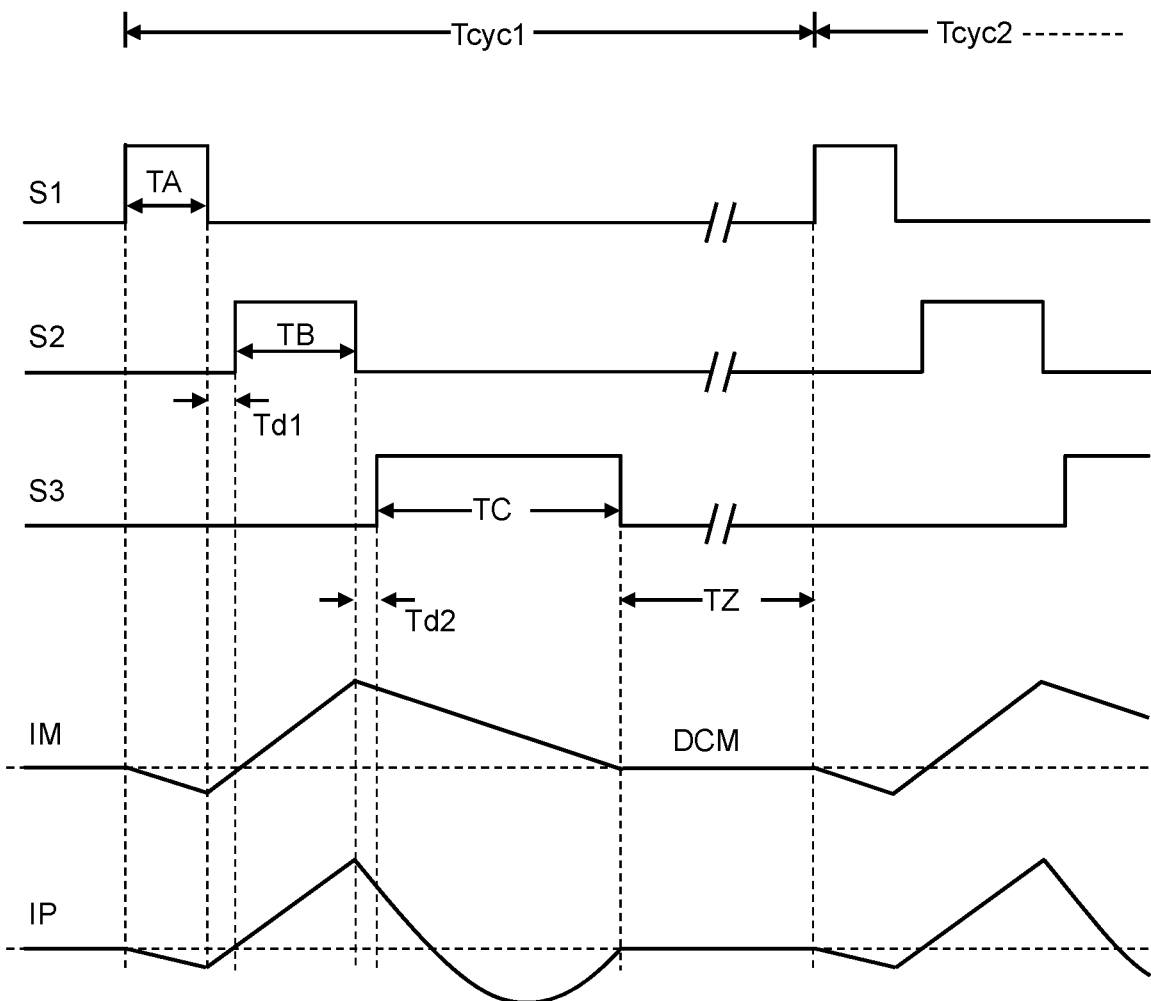
FIG. 12 shows operating waveforms of one preferred embodiment of the primary-side controller 201 operating in DCM operation according to the present invention.

FIG. 12 shows operating waveforms of one preferred embodiment of the primary-side controller 201 operating in DCM operation according to the present invention. During the DCM operation, the primary-side controller 201 operates in a first switching cycle Tcyc1 and controls the first driving signal S1 to turn on the first transistor M1 with a first period TA for generating the circulating current that will achieve ZVS for the turn-on of the second transistor M2. After the first period TA, the first driving signal S1, the second driving signal S2 and the third driving signal S3 are controlled to turn off the first transistor M1, the second transistor M2 and the third transistor M3 for a first off-time period Td1 (i.e. a dead time). In one embodiment, the first off-time period Td1 is related to a quasi-resonant period for achieving ZVS of the second transistor M2. After the first off-time period Td1, the second driving signal S2 controls the second transistor M2 to turn on for a second period TB. The turn-on of the second transistor M2 is applied to magnetize the transformer 10. After the second period TB, the first driving signal S1, the second driving signal S2 and the third driving signal S3 are configured to turn off the first transistor M1, the second transistor M2 and the third transistor M3 for a second off-time period Td2 (i.e. a dead time). The second off-time period Td2 is related to another quasi-resonant period for achieving ZVS of the third transistor M3. After the second off-time period Td2, the third driving signal S3 controls the third transistor M3 to turn on for a third period TC. The third transistor M3 is turned on during the demagnetizing period of the transformer 10. After the third period TC, the first driving signal S1, the second driving signal S2 and the third driving signal S3 are configured to turn off the first transistor M1, the second transistor M2 and the third transistor M3 for a third off-time period TZ, wherein the magnetizing current IM stays at zero (i.e. DCM) during the third off-time period TZ. After the third off-time period TZ, another switching cycle Tcyc2 starts.

Figure 13:
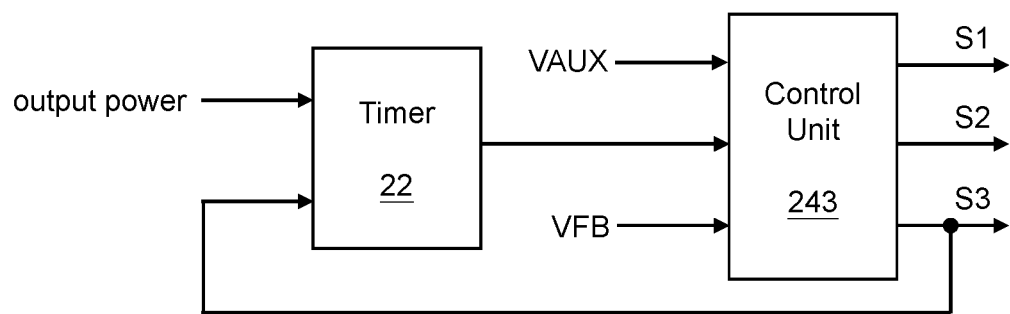
FIG. 13 shows a block diagram of a preferred embodiment of the primary-side controller according to the present invention.

FIG. 13 shows a block diagram of a preferred embodiment of the primary-side controller according to the present invention. In one embodiment, the primary-side controller 213 includes a timer 22 and a control unit 243. The control unit 243 is configured to generate the first driving signal S1, the second driving signal S2 and the third driving signal S3 according to the input voltage VIN (through VAUX) and the feedback signal VFB.

The timer 22 is configured to time to generate the third off-time period TZ, which is triggered by the end (e.g. the falling edge) of the pulse of the third driving signal S3. In one embodiment, the third off-time period TZ is increased in response to the decrease of output power of the flyback power converter. Therefore, the switching frequency of the flyback power converter can be decreased in response to the decrease of the output power of the flyback power converter for improving the efficiency in light load operation.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. 1. A flyback power converter which is configured as a resonant flyback power converter, comprising:

a first transistor and a second transistor which are connected to a switching node to form a half-bridge circuit; and a transformer and a resonant capacitor which are connected in series forming a resonant tank, wherein the resonant tank is connected to the switching node and is switched by the half-bridge circuit;

wherein the first transistor is configured to switch the resonant tank for generating a primary switching current and an output voltage;

wherein the second transistor is configured to switch the resonant tank for generating a circulated current to achieve ZVS (zero voltage switching) of the first transistor, and for generating a demagnetized current;

wherein the flyback power converter performs at least one switching cycle of an actively forced DCM (discontinuous conduction mode) operation when the primary switching current is determined and counted to have been operating in a non-DCM operation for a predetermined number of switching cycles, wherein during the actively forced DCM operation, an OFF time between two neighboring ON periods of the first transistor is actively forced to be longer to an extent that the flyback power converter is forced to operate in DCM;

wherein the flyback power converter calibrates a period of a demagnetized signal based on a demagnetized time during the actively forced DCM operation by detecting a knee point related to the switching node;

wherein the period of the demagnetized signal, calibrated during the actively forced DCM operation, is configured to emulate the demagnetized time of the transformer for controlling the second transistor during the subsequent non-DCM operation.

2. The flyback power converter of claim 1, wherein in the actively forced DCM operation, the flyback power converter detects a knee point of a reflected voltage from an auxiliary winding of the transformer for calibrating the demagnetized signal during the first transistor being off, wherein a period of the reflected voltage, determined by the knee point, is related to the demagnetized time of the transformer.

3. The flyback power converter of claim 2, wherein in the actively forced DCM operation, the second transistor is controlled to be off after first transistor is turned off, such that the half-bridge circuit operates in an asynchronous mode, wherein the knee point is generated by a demagnetized current, flowing through a body diode of the second transistor and the resonant capacitor, ramping down to 0 in the asynchronous mode.

4. The flyback power converter of claim 1, further comprising a counter configured to operably count a number of switching cycles operating in the non-DCM operation and enable the actively forced DCM operation when the primary switching current has been counted being operated in the non-DCM operation for a predetermined number of switching cycles.

5. The flyback power converter of claim 1, wherein during the non-DCM operation, the pulse period of the demagnetized signal, calibrated during the actively forced DCM operation, is utilized to control a lower limit of an on time of the second transistor for demagnetizing the transformer after turning off the first transistor during subsequent non-DCM operation.

6. The flyback power converter of claim 1, wherein the pulse period of the demagnetized signal is correlated to a level of an input voltage of the transformer during the magnetized time thereof, a level of the output voltage of the transformer and an on-time period of the first transistor.

7. The flyback power converter of claim 1, further comprising a tuning device for generating the demagnetized signal; wherein the flyback power converter adjusts a parameter of the tuning device to calibrate the demagnetized signal according to the demagnetized time of the transformer during the actively forced DCM operation.

8. The flyback power converter of claim 7, wherein the tuning device is a resistor and the parameter is the resistance of the resistor.

9. The flyback power converter of claim 1, wherein after the actively forced DCM operation, a second driving signal is turned on with a ZVS pulse firstly to generate a negative circulated current to achieve ZVS for the first transistor.

10. A switching control circuit for controlling a flyback power converter which is configured as a resonant flyback power converter, wherein the flyback power converter includes: a first transistor and a second transistor which are connected to a switching node to form a half-bridge circuit; and
a transformer and a resonant capacitor which are connected in series forming a resonant tank, wherein the resonant tank is connected to the switching node and is switched by the half-bridge circuit;
wherein the first transistor is configured to switch the resonant tank for generating a primary switching current and an output voltage;
wherein the second transistor is configured to switch the resonant tank for generating a circulated current to achieve ZVS (zero voltage switching) of the first transistor, and for generating a demagnetized current; the switching control circuit comprising:
a control unit, configured to operably generate a first signal for controlling the first transistor and a second signal for controlling the second transistor according to a feedback signal which is related to the output voltage; and
a cycle counter, configured to operably count a number of switching cycles operating in a non-DCM operation according to the primary switching current;
wherein the control unit performs at least one switching cycle of an actively forced DCM (discontinuous conduction mode) operation when the primary switching current is determined and counted to have been operating in the non-DCM operation for a predetermined number of switching cycles, wherein during the actively forced DCM operation, an OFF time between two neighboring ON periods of the first transistor is actively forced to be longer to an extent that the flyback power converter is forced to operate in DCM;
wherein the control unit calibrates a period of a demagnetized signal based on a demagnetized time during the actively forced DCM operation by detecting a knee point related to the switching node;
wherein the period of the demagnetized signal, calibrated during the actively forced DCM operation, is configured to emulate the demagnetized time of the transformer for controlling the second transistor during the subsequent non-DCM operation.

11. The switching control circuit of claim 10, wherein in the actively forced DCM operation, the control unit detects a knee point of a reflected voltage from an auxiliary winding of the transformer for calibrating the demagnetized signal during the first transistor being off, wherein a period of the reflected voltage, determined by the knee point, is related to the demagnetized time of the transformer.

12. The switching control circuit of claim 11, wherein the first transistor and the second transistor form a half-bridge circuit, wherein in the actively forced DCM operation, the second transistor is controlled to be off after first transistor is turned off, such that the half-bridge circuit operates in an asynchronous mode, wherein the knee point is generated by a demagnetized current, flowing through a body diode of the second transistor and the resonant capacitor, ramping down to 0 in the asynchronous mode.

13. The switching control circuit of claim 10, wherein during the non-DCM operation, the pulse period of the demagnetized signal, calibrated during the actively forced DCM operation, is utilized to control a lower limit of an on time of the second transistor for demagnetizing the transformer after turning off the first transistor during subsequent non-DCM operation.

14. The switching control circuit of claim 10, wherein the pulse period of the demagnetized signal is correlated to a level of an input voltage of the transformer during the magnetized time thereof, a level of the output voltage of the transformer and an on-time period of the first transistor.

15. The switching control circuit of claim 10, wherein the switching control circuit further adjusts a parameter of a tuning device coupled to the flyback power converter to calibrate the demagnetized signal according to the demagnetized time of the transformer during the actively forced DCM operation.

16. The switching control circuit of claim 15, the tuning device is a resistor and the parameter is the resistance of the resistor.

17. The switching control circuit of claim 10, wherein after the actively forced DCM operation, the second driving signal is turned on with a ZVS pulse firstly to generate a negative circulated current to achieve ZVS for the first transistor.

18. The switching control circuit of claim 11, wherein the control unit includes a demagnetizing emulator for generating the demagnetized signal, wherein the demagnetizing emulator includes:
an integration capacitor and a switch coupled to sample and hold a current sense signal which is related to the primary switching current; and
a discharging circuit, configured to operably generate a discharging current related to the output voltage for discharging the integration capacitor;
wherein the demagnetized signal is generated according to a voltage across the integration capacitor discharged by the discharging current from an end of magnetizing the transformer.

19. A control method for controlling a flyback power converter, wherein the flyback power converter which is configured as a resonant flyback power converter includes: a first transistor and a second transistor which are connected to a switching node to form a half-bridge circuit; and
a transformer and a resonant capacitor which are connected in series forming a resonant tank, wherein the resonant tank is connected to the switching node and is switched by the half-bridge circuit;
wherein the first transistor is configured to switch the resonant tank for generating a primary switching current and an output voltage;
wherein the second transistor is configured to switch the resonant tank for generating a circulated current to achieve ZVS (zero voltage switching) of the first transistor, and for generating a demagnetized current; the control method comprising:
generating a first signal for controlling the first transistor and a second signal for controlling the second transistor according to a feedback signal which is related to the output voltage;

counting a number of switching cycles operating in a non-DCM operation according to the primary switching current;

performs at least one switching cycle of an actively forced DCM (discontinuous conduction mode) operation when the primary switching current is determined and counted to have been operating in the non-DCM operation for a predetermined number of switching cycles, wherein during the actively forced DCM operation, an OFF time between two neighboring ON periods of the first transistor is actively forced to be longer to an extent that the flyback power converter is forced to operate in DCM;

calibrating a period of a demagnetized signal based on a demagnetized time during the actively forced DCM operation by detecting a knee point related to the switching node; and emulating the demagnetized time of the transformer for controlling the second transistor during the subsequent non-DCM operation based on the period of the demagnetized signal which is calibrated during the actively forced DCM operation.

20. The control method of claim 19, wherein the step of calibrating the demagnetized signal includes:

in the actively forced DCM operation, detecting a knee point of a reflected voltage from an auxiliary winding of the transformer for calibrating the demagnetized signal during the first transistor being off, wherein a period of the reflected voltage, determined by the knee point, is related to the time of the demagnetized transformer.

21. The control method of claim 20, wherein the first transistor and the second transistor form a half-bridge circuit, wherein the step of calibrating the demagnetized signal further includes: in the actively forced DCM operation, controlling the second transistor to be off after first transistor is turned off, such that the half-bridge circuit operates in an asynchronous mode, wherein the knee point is generated by a demagnetized current, flowing through a body diode of the second transistor and the resonant capacitor, ramping down to 0 in the asynchronous mode.

22. The control method of claim 19, wherein the step of generating the first signal and the second signal includes:

controlling a lower limit of an on time of the second transistor during subsequent non-DCM operation according to the pulse period of the demagnetized signal which is calibrated during the actively forced DCM operation for demagnetizing the transformer after turning off the first transistor.

23. The control method of claim 19, wherein the pulse period of the demagnetized signal is correlated to a level of an input voltage of the transformer during the magnetized time thereof, a level of the output voltage of the transformer and an on-time period of the first transistor.

24. The control method of claim 19, wherein the step of calibrating the demagnetized signal further includes:

adjusting a parameter of a tuning device coupled to the flyback power converter to calibrate the demagnetized signal according to the demagnetized time of the transformer during the actively forced DCM operation.

25. The control method of claim 24, wherein the tuning device is a resistor and the parameter is the resistance of the resistor.

26. The control method of claim 19, further comprising:

after the actively forced DCM operation, turning on the second transistor by a first pulse of the second driving signal after the DCM operation to magnetize the transformer from the resonant capacitor of the flyback power converter to the transformer, thereby generating a negative circulated current to achieve ZVS for the first transistor, wherein the resonant capacitor is connected in series with the transformer.

* * * * *